D. TURNER.
FABRIC MEASURING AND COST COMPUTING MACHINE.
APPLICATION FILED SEPT. 13, 1920.

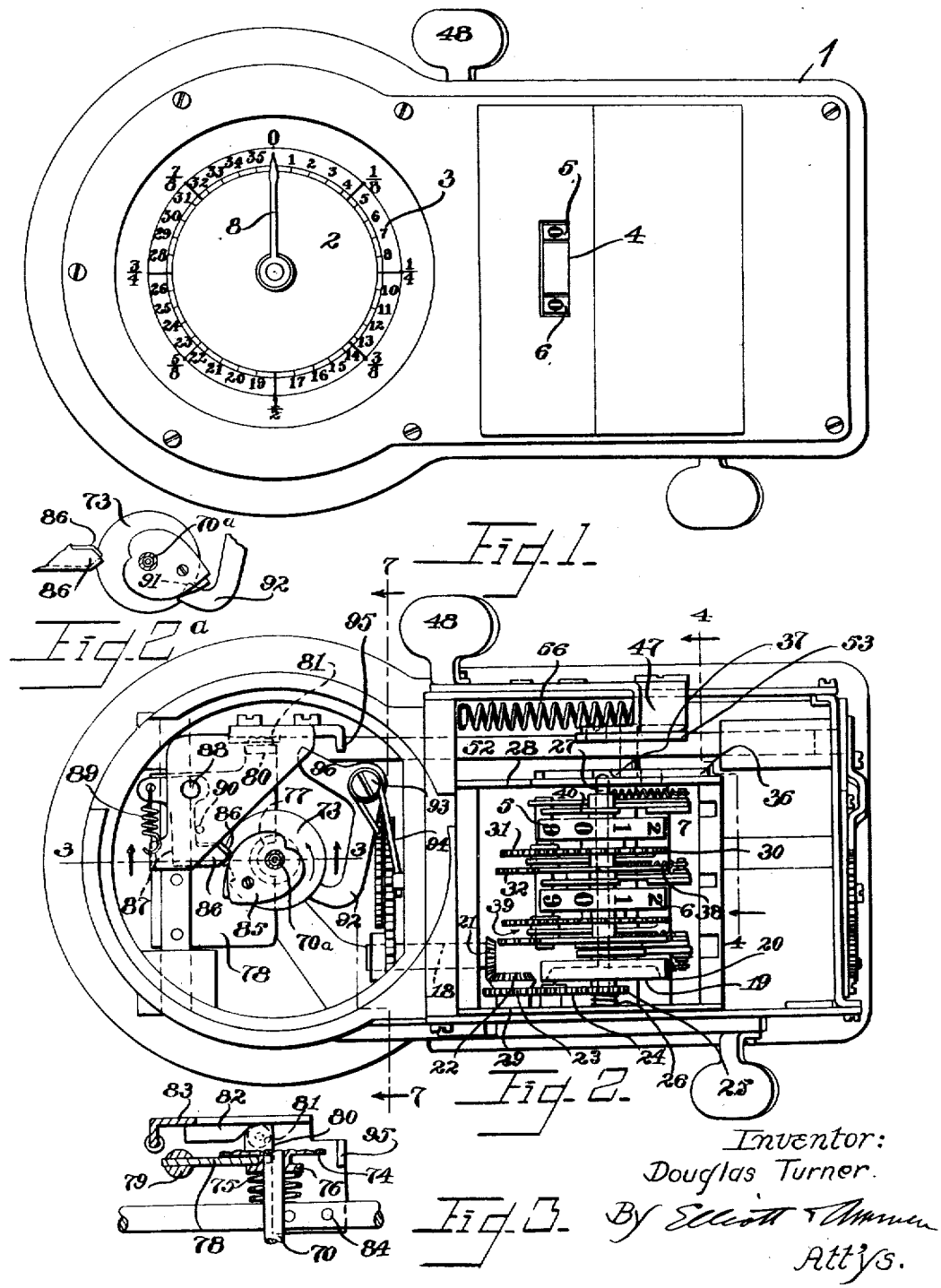

1,415,498.

Patented May 9, 1922.
3 SHEETS—SHEET 2.

Inventor:
Douglas Turner.
By Elliott & Ammen
Attys.

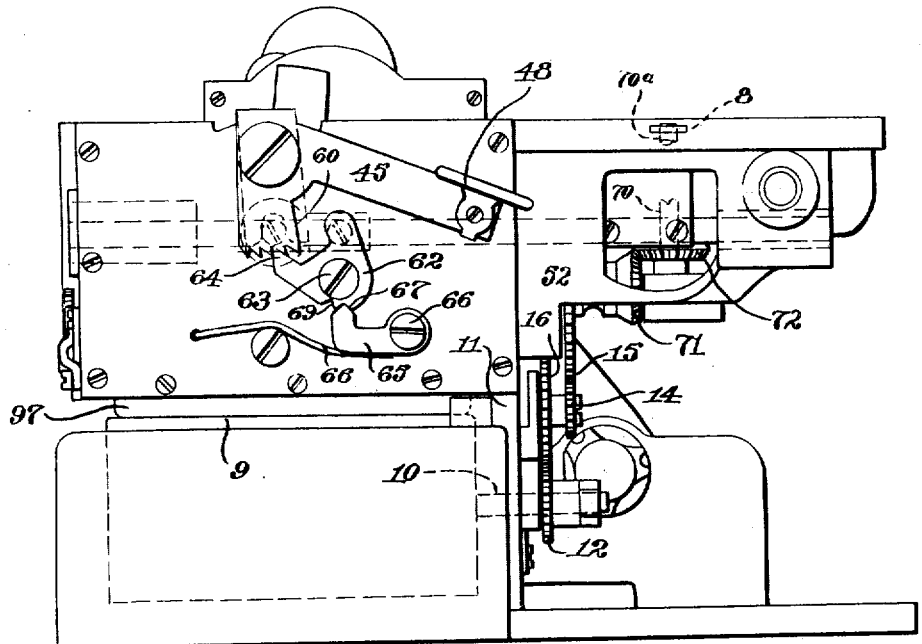

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF MISSOURI.

FABRIC-MEASURING AND COST-COMPUTING MACHINE.

1,415,498. Specification of Letters Patent. Patented May 9, 1922.

Application filed September 13, 1920. Serial No. 409,834.

*To all whom it may concern:*

Be it known that I, DOUGLAS TURNER, a citizen of the United States, residing in the city of St. Louis and State of Missouri, have invented new and useful Improvements in Fabric-Measuring and Cost-Computing Machines, of which the following is a specification.

This invention relates to measuring machines, and although many features of the invention are applicable to machines used for different purposes, in the following specification I have described the invention as applied to a machine for measuring fabric. The general object of the invention is to produce a machine of simple construction which will have a large measuring range; and also to provide simple means for setting back the indicating parts to the zero position. A preferred embodiment of the invention described in the following specification, includes an indicating pointer co-operating with a dial to indicate fractions of the measuring unit and a totalizing mechanism for indicating the total number of yards, or other measuring units. A special object of the invention is to provide very simple means for effecting the return of the indicating pointer for the yard fractions, and for returning the number wheels of the totalizer to their zero position, and to construct the mechanism in such a way as to insure that the indicating parts will be completely returned to zero, in the returning movement.

Further objects of the invention will appear hereinafter.

The invention consists in the novel features, and in the general combination of parts to be particularly described hereinafter, all of which contribute to produce a simple and efficient fabric measuring and cost computing machine. A preferred embodiment of my invention will be particularly described in the following specification, while the broad scope of my invention will be pointed out in the appended claims.

In the drawing,

Figure 1 is a plan of a machine embodying my invention;

Figure 2 is a plan of the machine shown in Figure 1, removed from the casing, the spindle of the indicating pointer being shown in section;

Figure 6:
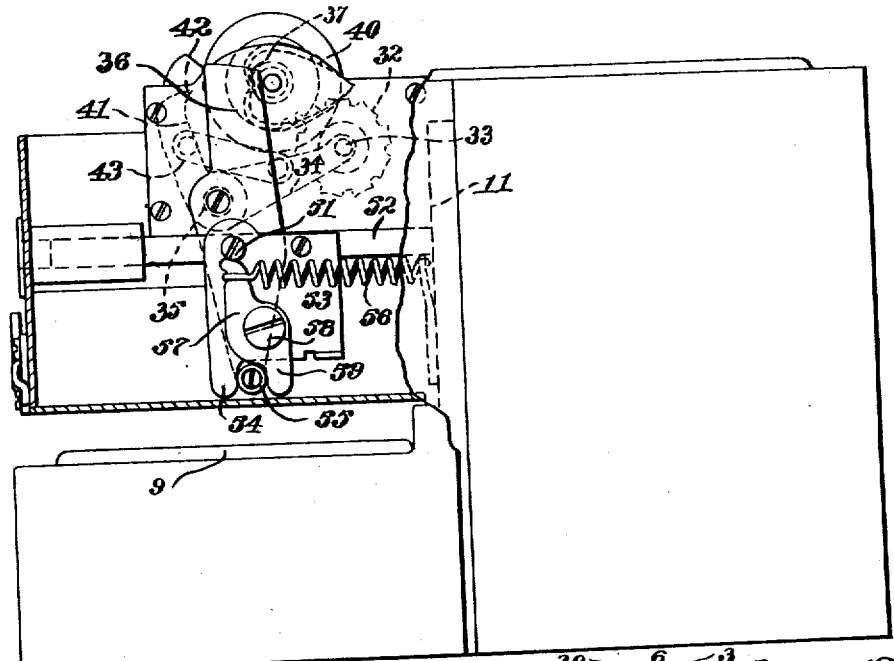
Figure 4:
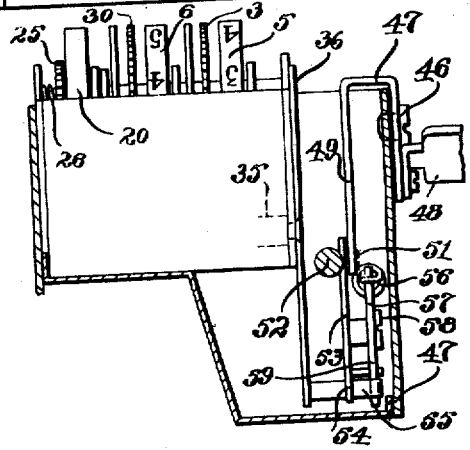
Figure 10:
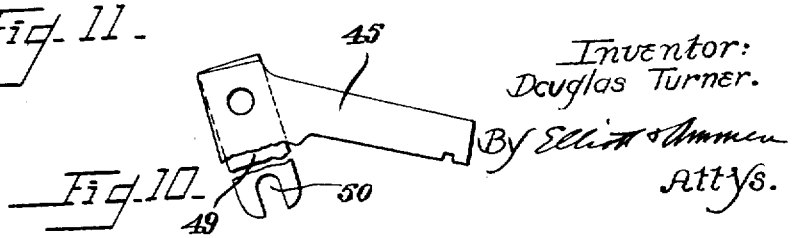

Figure 2ᵃ is a plan particularly illustrating the means for returning the indicating pointer to zero;

Figure 3 is a vertical section taken about on the line 3—3 of Figure 2 and particularly illustrating the means for opening the clutch that drives the indicating pointer;

Figure 4 is a vertical cross section through the upper part of the machine taken about on the line 4—4 of Figure 2, certain parts being broken away;

Figure 5 is a side elevation of the machine showing a portion of the casing broken away and showing a portion of the frame of the machine in cross section;

Figure 6 is a side elevation of the machine, removed from the casing;

Figure 7 is a vertical cross section through the machine, taken about on the line 7—7 of Figure 2;

Figure 8 is a side elevation, illustrating details of means which I may employ for insuring a complete return of the totalizer wheels to their zero position;

Figure 9 is a view similar to Figure 8, showing the same parts in another position; and Figure 10 is a side elevation, partially broken away, illustrating details of the construction of the controlling lever by means of which the mechanism may be set back to zero.

Figure 11:
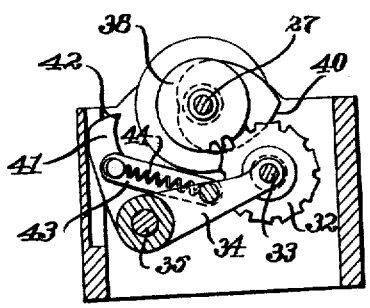

Figure 11 is a vertical cross section through the totalizer, certain parts being omitted; this view shows the carrying mechanism in its normal position with relation to the number wheel.

In the drawing, 1 represents the casing of the machine on the upper face of which a dial 2 is placed, bearing a scale 3 that indicates fractions of the measuring unit. In the present instance, this scale indicates inches and yard fractions. The casing includes a substantially rectangular extension, the upper side of which is provided with a window 4 through which number wheels 5 and 6 are visible; these wheels constitute part of a totalizer mechanism 7 (see Fig. 2). On the dial 2 there is mounted an indicating pointer 8; this pointer 8 and the number wheels 5 and 6 of the totalizer mechanism are both driven from a measuring roller 9 (see Fig. 6) which is located in the lower portion of the machine. Any suitable driving mechanism or driving gear train may be provided for this purpose, (see Fig. 7). For this purpose the shaft 10 of the measuring roller (see Fig. 6) extends through a vertical frame plate 11 of the machine and carries a driving pinion 12. This driving pinion 12 drives a large gear wheel 13 (see Fig. 7) which is rigid with the pinion 14 that drives the large gear wheel 15. This large gear wheel is rigid with a pinion 16, meshing with a gear wheel 17 carried on a horizontal shaft 18 which extends through the frame plate 11 to drive the totalizer mechanism 7 (see Fig. 2.) This totalizer mechanism may be of any suitable construction. This mechanism includes a friction clutch, comprising a clutch member 19 and a driven clutch member 20; the clutch member 19 may be driven from the shaft 18 through bevel gears 21 and 22, the latter of which carries a rigid pinion 23 that drives an idler 24 meshing with a pinion 25 carried rigidly by the clutch member 19. A coil spring 26 is provided which tends to hold the clutch member 19 in frictional engagement with the clutch member 20. The clutch member 20 is rigidly attached to an inner shaft 27 which is mounted to slide a slight amount, in end frame plates, 28 and 29 of the totalizer frame. The construction of the totalizer mechanism is such that by the movement of a controlling lever the clutch 19, 20, can be opened by sliding the inner shaft 27. The details of the construction of the totalizer mechanism are unimportant but are substantially the same as shown in a prior application filed by Douglas Turner et al., Serial No. 289,755. However, the construction should be such that when the clutch is open the two number wheels 5 and 6 may be returned automatically to their zero position. For this purpose the number wheel 5 which is mounted loosely on the inner shaft 27 is rigid with a gear wheel 30 which meshes with a pinion 31 (see Fig. 2). This pinion 31 is rigid with a Geneva stop wheel 32 (see Fig. 11) that is carried on a carrier shaft 33 supported on arms 34. These arms 34 are all mounted on a shaft 35 (see Fig. 5) the ends of which are rotatably mounted in the end plates 28 and 29. On the face of the end plate 28 there is mounted a cam plate 36 which is rigid with the shaft 35 and the upper edge of this plate is formed with a cam edge 37 that is in position to engage the projecting end of the inner shaft 27 if the shaft 35 is rotated in a clockwise direction (see Fig. 5). When this shaft is so rotated the cam edge 37 slides the inner shaft 27 inwardly, that is to say, in a direction to open the clutch at 19, 20. This rotation of the shaft 35 also effects the return movement of the number wheels 5 and 6 to zero. The carrying from the counter wheel 6 to the counter wheel 5 is effected by means of a Geneva disk 38 that is rigid with the number wheel 6 and co-operates with the Geneva stop wheel 32 (see Fig. 11). At each revolution of the counter wheel 6 the tooth on the Geneva disk 38 effects partial rotation of the stop wheel 32. This rotation is imparted to the pinion 31, which in turn imparts its movement to the gear wheel 30 and thereby rotates the number wheel 5 through one number space. In some machines it may be desired to use the outer face of the clutch member 20 as a number wheel and hence in this particular machine the wheel 20 is driven in unison with the pointer, 8 and at each revolution of the pointer 8 and the clutch member 20 a rotation is imparted through carrying mechanism 39 to the number wheel 6. This carrying mechanism 39 and the parts co-operating with it are substantially the same in construction as the parts described in connection with the Geneva stop movement described above for carrying from the wheel 6 to the wheel 5. When the shaft 35 is rotated in a clockwise direction and thereby opens the clutch, the arms 34 will swing away from the counter wheels and thereby disengage the carrier mechanisms from the counter wheels. The counter wheels are free to rotate on the inner shaft 27. A continued rotation of the shaft 35 in the same direction will effect the return of the counter wheels to zero. In order to accomplish this each counter wheel is provided with a rigid heart-shaped cam 40 and opposite each of these cams 40 there is provided an arm 41 (see Fig. 11) each arm terminating in a point 42. These arms 41 are not rigid with the shaft 35 but are each connected by a link 43 and spring 44 with a corresponding arm 34. Now when the arms 34 are swung away from the counter wheels the points 42 come against the heart-shaped cams 40 and rotate the counter wheels around to their zero position.

The pointer 8 is also driven through a clutch of its own and I provide means in the form of a hand-operated member for simultaneously opening that clutch with the clutch composed of the members 19 and 20, and I also provide means actuated and moved by the hand-operated member for returning the pointer 8 to its zero position. These movements are all effected by means of a controling lever 45 which is pivotally mounted at 46 (see Fig. 4) on a frame plate 47 of the machine, and the lever may be operated from the exterior of the machine by means of a thumb plate 48. This lever 45 is bent into the shape of an inverted U and has a long arm 49 (see Fig. 4) which extends down into the interior of the machine. The lower end of this arm has a notch 50 which loosely engages a pin 51 on the side of a slide bar 52 which is mounted to slide longitudinally in the machine. From this slide bar 52 I impart movement to the cam lever 36, referred to above. For this purpose the slide bar 52 is provided with a rigid plate 53 which extends downwardly from it (see Figs. 4 and 5). The pin 51 may be constructed as a screw for securing this plate to the slide bar 52. The lower edge of the plate 53 is formed into a downwardly projecting dog 54 and this dog engages the side of a pin 55 projecting outwardly from the lower end of the lever 36 (see Fig. 5). With this construction it will be evident that if the controlling lever 45 is moved in a downward direction (see Fig. 10) the slide bar 52 will be slid toward the left as viewed in Fig. 5 and the cam plate 36 will be rotated in a clockwise direction with the effects described above. In order to return the slide bar 52 and the lever 45 after they have been operated I provide a coil spring 56 (see Fig. 5) one end of which is anchored to the vertical frame plate 11 and the other end of which is attached to a trigger plate 57 which is pivotally mounted at 58 on the face of this plate 53, the lower end of the trigger plate being provided with a downward projecting dog 59 which engages the side of the pin 55 opposite to the aforesaid dog 54. By means of the trigger plate 57 this spring 56 not only performs the function of returning the slide bar 52 after it has been operated but it also holds the lever 36 so that the pin 55 will always be in engagement with the dog 54. With a construction such as that described for the totalizer it is evident that the controlling lever 45 must be completely depressed in order to effect the return of the number wheels 5 and 6 to their zero position. Hence it is advisable to provide this machine with means for insuring that the controlling lever 45 will be completely depressed whenever it is operated. Without such a safety device a careless operator might depress the lever 45 partially and open the clutch 19, 20 without returning the wheels 5 and 6 to zero. I shall now describe the safety device which I provide to insure the complete depression of the controlling lever 45.

For this purpose the controlling lever is provided with a segment 60 having ratchet teeth 61 which are inclined (see Figs. 6 and 8). Co-operating with this segment I provide a detent pawl 62 in the form of a plate pivoted at 63 on the frame plate 47 of the machine. This pawl plate 62 has a point 64 which normally engages the ratchet teeth 61 as shown in Figure 6. The pawl plate 62 is normally held in this position by means of a small pilot pawl 65 pivotally mounted on the plate 47 at 65ª, and pressed up by spring 66 so that its point engages a notch 67 in the edge of the pawl plate 62. Now if the parts are in the position as shown in Fig. 6 it is evident that if the lever 45 is depressed, the point 64 of the pawl 62 will maintain engagement with the teeth 61 and prevent the lever 45 from returning. Such a partial depression of the lever 45 is illustrated in Fig. 8. However, I construct these parts so that a complete depression of the lever 45 will effect the disengagement of the point 64 from the teeth 61 and permit the lever 45 to return. For this purpose I provide the pawl 62 with an extension or tail 68 which projects upwardly and into the path of the lever 45 as it descends. From an inspection of Fig. 8 it will be seen that any further downward movement of the lever 45 will effect a movement of the tail 68 by the lever 45 so as to swing the pawl 62 in an anticlockwise direction. This will disengage the tooth 64 from the teeth 61 and will swing the pawl 62 far enough around to enable a second notch 69 (similar to the notch 67) to be engaged by the pilot pawl 65. The lever 45 will then commence its upward return movement through the clutch of the coil spring 56. In moving up in this way the edge of the segment 60 will engage the side of the extension or tail 68 and just as the lever 45 arrives at its normal or inactive position the segment will have returned the pawl 62 to its normal position shown in Fig. 6. In this way the segment 60 and the yieldingly held pawl operate as a check device to effectively prevent a partial depression of the controlling lever 45.

I shall now describe the means whereby the movement of the slide bar 52 also operates to open the clutch of the pointer 8 and return the same to zero. The pointer 8 is carried on the upper end of a spindle 70ª (see Fig. 6) which is driven through bevel gears 71 and 72, the former of which is rigid with the aforesaid gear wheel 15 which is driven by the pinion 14. To drive spindle 70 (see Figs. 2 and 3) there is provided a clutch composed of an upper clutch member 73 and a lower clutch member 74, the latter of which is constructed as a loose collar on a spindle 70, being normally pressed upwardly against the clutch member 73 by a coil spring 75. The collar 76 of the clutch member 74 is engaged by a notch 77 in the edge of an actuating plate 78, the function of which is to open the clutch. This plate is secured at one edge to a rock shaft 79. One side of the plate 78 extends over to a point near the slide bar 52 at which point it has an upwardly extending lug 80 carrying a small roller 81. This roller is adapted to be engaged by a cam 82 formed on the under side of a plate 83 (see Fig. 3) which plate 83 is rigidly secured at 84 to the side of the slide bar 52. With this construction it is evident that if the slide bar 52 moves toward the right as viewed in Fig. 2, it will operate the clutch plate 78 to open the clutch. In order to effect the return of the spindle 70ª to zero I provide the same with two heart-shaped cams 85 and I also provide the under side of the plate 83 with two pawls 86 the points of which cooperate with the heart-shaped cams 85. These pawls 86 are formed on a pawl plate 87 which is pivoted at 88 on the under side of the plate 83 and they carry a spring 89 which normally holds the pawl plate 87 against a fixed stop pin 90. This spring 89 enables the pawls 86 to yield slightly when they engage the cams 85 in returning the spindle 70ª and its pointer 8 to the zero position. Fig. 2ª shows the parts in the zero position. At this time a shallow notch 91 formed in the edge of the clutch member 73 is engaged by the end of a detent pawl 92. This pawl is pivoted at 93 (see Fig. 2) and is provided with a spring 94 which tends to hold the end of the pawl against the edge of the clutch member 73. The function of this pawl is to stop the pointer 8 exactly in its zero position after it has been returned to this position. In Fig. 2 the slide bar 52 is illustrated in a position displaced toward the right, as it would be in returning the pointer 8 to zero. In this position the clutch 19—20 would be open; the clutch at 74 would also be open. The detent pawl 92 is then controlled by its spring 94 and will stop the spindle 70 with the pointer 8 in the zero position. However, when the slide bar 52 moves back toward the left as viewed in Fig. 2 and resumes its normal position it will operate to disengage the pawl 92 from the notch 91. For this purpose the plate 83 is provided with a dog 95 that engages the tail 96 extending from the pawl 92. The tail 96 simply projects into the path of this dog 95. Co-operating with the measuring roller 9 there is provided the usual presser roller indicated at 97 (see Fig. 6) the details of which it is unnecessary to illustrate.

I shall now describe the general mode of operation of the machine. The fabric to be measured is drawn between the measuring roller 9 and the presser roller 97 and the movement of the measuring roller is imparted through the gear trains to the pointer 8, through its clutch members 73 and 74, and to the totalizing mechanism, through the shaft 18 and the clutch members 19 and 20. The pointer 8 cooperates with its scale 3 to indicate yard fractions. At each complete revolution of the pointer 8 the units wheel 6 will be advanced through one number space so as to indicate the number of yards measured. At each complete revolution of the number wheel 6 the tens wheel 5 will be rotated through one number space. Hence the machine illustrated will have the capacity of one hundred yards. In practice, however, it will be evident that a greater number of number wheels may be employed if desired to give the machine a larger range or measuring capacity. After the completion of the measuring operation the pointer 8 and the indicator wheels 5 and 6 may be returned to zero by simply depressing the controlling lever 45. Depressing the controlling lever 45 operates through the extension 49 thereof (see Fig. 4) to give the slide bar 52 a sliding movement. This operates through the plate 53 to move the clutch lever or clutch plate 36, the cam edge 37 of which (see Fig. 2) engages the projecting end of the shaft 27. This slides the shaft 27 and opens the clutch 19, 20. The clutch lever 36 is rigid with the shaft 35 (see Figs. 5 and 11) which carries the arms 34 and 41; therefore, the continued movement of the shaft in a right hand direction disengages the carrying mechanism from the number wheels 5 and 6 and the arms 41 engage the cams 40 of the number wheels and return the same to zero. The sliding movement of the slide bar 52 operates through the cam 82 (see Fig. 3) to effect a downward swinging movement of the clutch plate 78 and this opens the clutch of the pointer 8 which is composed of the sliding collar 74 and the clutch member 73. The sliding movement of the slide bar 52 also engages the pawls 86 with their heart-shaped cams 85 and effects the return of the pointer 8 to zero. As soon as the pointer arrives at the zero position the pawl 92 (see Fig. 2) engages the notch 91 and holds the pointer at zero. When the slide bar 52 moves back toward the left as viewed in Fig. 2 the dog 95 engages the tail lever 96 of the pawl 92 and disengages the pawl so as to permit the pointer 8 to be advanced by the measuring roller.

I have illustrated two cams 85 and two pawls 86 in a slightly displaced angular position with relation to each other so as to prevent any possibility of these parts failing to operate, as might occur if a single pawl 86 were used and it happened to engage directly upon the point of the cam. This feature of the device is a distinct invention and is covered in a prior application Ser. No. 289,755. The lever 45 can not be partially depressed and then returned by the spring 56 by reason of the presence of the segment 60 which co-operates with the pawl 62 as illustrated in Figs. 6, 8 and 9. However, if the lever 45 is completely depressed the pawl 62 will become disengaged from the segment and will then permit the lever 45 to return to its normal position.

What I claim is:

1. In a measuring machine, the combination of an indicator including a pointer for indicating fractions of the unit of measure, a totalizer mechanism having a plurality of counter-wheels carrying numbers for indicating quantities in the unit of measure, a measuring roller, a clutch for driving the indicator pointer from the measuring roller, a second clutch for driving the totalizer mechanism from the measuring roller, a hand-operated member, means actuated thereby for opening both clutches, and means also actuated thereby for returning the indicator pointer and the counter-wheels to their zero position when the clutches are open.

2. In a fabric measuring machine, the combination of a casing, an indicator dial having an indicator pointer, mounted at the upper side of the casing for indicating fractions of the unit of measure, a totalizer mechanism having a plurality of counter-wheels mounted in said casing, said casing having a window in the upper side thereof through which the counter-wheels are visible, a measuring roller, a pointer clutch for driving the pointer from the measuring roller, a totalizer clutch for driving the totalizer mechanism from the measuring roller, a hand-operated member, means actuated thereby for opening the totalizer clutch, return cams on the counter-wheels, respectively, means actuated by the hand-operated member for engaging the cams to return the counter-wheels to zero, a return cam for returning the pointer, a bar actuated by the hand-operated member for opening the indicator clutch, and means actuated by the bar for engaging the pointer cam to return the pointer to zero when its clutch is open.

3. A fabric measuring machine constructed as specified in claim 1, in combination with means associated with the hand-operated member to insure a complete depression thereof when the same is actuated.

4. In a fabric measuring machine, the combination of indicating mechanism, a measuring roller, a clutch for driving the indicating mechanism from the measuring roller, a hand-operated member, means actuated thereby for opening the clutch, means also actuated by and moved by said hand-operated member for returning the indicating mechanism to zero, and means associated with the hand-operated member to insure a complete movement thereof when the same is actuated.

5. In a fabric measuring machine, the combination of a casing having an indicating dial on its upper side, a vertical spindle and pointer actuated thereby, co-operating with the dial, a clutch associated with the spindle, a totalizer mechanism including a substantially horizontal shaft with counter-wheels disposed on the shaft and visible through the upper wall of the casing, a clutch associated with the totalizer mechanism, a controlling lever mounted on the side of the casing, means actuated thereby for opening both of the clutches, and means also actuated by the lever for returning the pointer to zero and for returning the counter wheels to zero.

6. In a machine of the character described, the combination of a controlling lever having a segment associated therewith, a detent pawl co-operating with the segment to prevent return of the controlling lever if the controlling lever should be only partially depressed, said detent pawl having an upwardly projecting tail between the segment and the lever disposed in the path of the segment and the lever, means co-operating with the detent pawl for yieldably holding the same in contact with the segment and out of contact with the segment, said detent operating to prevent a return movement of the controlling lever if the same is only partially depressed, and said lever operating to engage said tail and release the segment from the detent pawl when the controlling lever is completely depressed.

7. In a measuring machine, the combination of an indicator having a dial and a rotary pointer co-operating therewith, a totalizer mechanism having a plurality of counter-wheels carrying numbers for indicating quantities in the unuit of measure, means for driving the pointer and the counter-wheels, a set-back lever for setting the counter-wheels back to zero, a slide bar actuated by the set-back lever, means controlled by the slide bar for setting the indicating pointer back to zero, and means co-operating with the set-back lever to prevent a return movement of the same unless the controlling lever is fully depressed.

8. In a fabric measuring machine, the combination of a frame and a casing having a dial, a pointer co-operating with the dial, a pointer clutch for driving the same, a totalizer mechanism mounted within said casing having a plurality of numbered counter-wheels, a totalizer clutch corresponding with the totalizer mechanism, a measuring roller, means for driving the counter-wheels from the measuring roller through their clutch and for driving the pointer through its clutch by the measuring roller, a rock shaft associated with the totalizer mechanism, means actuated thereby for opening the totalizer clutch and for returning the counter-wheels to zero, a slide bar, an actuating lever for the rock shaft, a slide bar having means for actuating the actuating lever, a controlling lever mounted on the frame for actuating the slide bar, and means actuated by the slide bar for opening the pointer clutch and for returning the pointer to zero.

In testimony whereof, I have hereunto set my hand.

DOUGLAS TURNER.